United States Patent
Katrak et al.

(10) Patent No.: US 7,277,265 B2
(45) Date of Patent: Oct. 2, 2007

(54) ROBUST POWER TAKE-OFF AND CRUISE ENABLE

(75) Inventors: Kerfegar K. Katrak, Fenton, MI (US); Barbara A. Shuler, Brighton, MI (US); Donald A. Eveleth, Highland, MI (US); Hugh S. Bauer, Macomb Township, MI (US); Bahram Younessi, Farmington, MI (US); Paul A. Bauerle, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 578 days.

(21) Appl. No.: 10/873,933

(22) Filed: Jun. 22, 2004

(65) Prior Publication Data

US 2005/0280311 A1    Dec. 22, 2005

(51) Int. Cl.
  *H01H 73/00*    (2006.01)
(52) U.S. Cl. ............................................. 361/115
(58) Field of Classification Search ................. 361/115
   See application file for complete search history.

(56) References Cited

U.S. PATENT DOCUMENTS 3,353,634 A * 11/1967  Farrar ..................... 188/106 R
3,477,536 A * 11/1969  Carini ........................ 180/65.5
4,451,775 A *  5/1984  Phillips et al. ................ 322/10
5,994,853 A * 11/1999  Ribbe ........................... 318/16
6,191,547 B1 *  2/2001  Fricke et al. ................ 318/547
6,522,034 B1 *  2/2003  Nakayama .................. 307/103
6,724,164 B2 *  4/2004  Shimizu et al. ............. 318/282

* cited by examiner

*Primary Examiner*—Michael Sherry
*Assistant Examiner*—Ann T. Hoang

(57) ABSTRACT

Apparatus are provided for robust power take off (PTO) and/or cruise enable. The apparatus includes a control module for PTO enable having a first input connected to one of a first reference voltage and a second reference voltage, and a second input connected to one of the first reference voltage and the second reference voltage. An inverse reference voltage operator is connected to both of the inputs and configured such that the second input is connected to the second reference voltage when the first input is connected to the first reference voltage and the second input is connected to the first reference voltage when the first input is connected to the second reference voltage. Based on the received voltage at the first and second inputs, the control module enables/disables PTO and/or cruise.

20 Claims, 3 Drawing Sheets

ROBUST POWER TAKE-OFF AND CRUISE ENABLE

TECHNICAL FIELD

The present invention generally relates to electrical switches in motor vehicle applications, and more particularly relates to logic-based switches controlling vehicle powertrain related applications.

BACKGROUND

In conventional motor vehicles, power take-off (PTO) and cruise control may be common features used in vehicle powertrain management. PTO has been used to provide power to up-fitter installed accessories, for example a bucket lift, also referred to as "cherry picker", a snow plow, a dump body, etc. PTO is a mechanism or technique, such as using a gearbox or bolt-on attachment, of driving a pump to supply power necessary to provide a function. Examples of common PTO applications include lifting or manipulating a dump body, a bucket lift, or a snow plow. Cruise control is a feature that permits a vehicle user to set and vary the speed of a vehicle.

Current cruise enable, or cruise on/off, switch configurations typically consist of an unasserted low or inactive state, such as a 0 Volts, and an asserted high or active state, such as a vehicle battery voltage. Alternatively, cruise enable switches may consist of an unasserted high or inactive state, such as vehicle battery voltage, and an asserted low or active state, such as 0 Volts. The alternative configuration is generally not used because of an undesirable failure mode. In a similar fashion to typical cruise enable switches, current PTO enable, or PTO on/off, switch configurations consist of an unasserted low or inactive state, such as 0 Volts, and an asserted high or active state, such as vehicle battery voltage.

Additionally, conventional cruise enable may be implemented within a 5 Volt range for cruise control where a portion thereof is allocated to cruise enable. For example, the 5 Volt range may be divided into 9 potential states from a 5 Volt analog input such that: a first potential state is corresponds to a short to battery; a second potential state corresponds to cruise enable; a third potential state corresponds to a dead-band between cruise enable and set/coast; a fourth potential state corresponds to set/coast; a fifth potential state corresponds to a dead-band between set/coast and resume/accelerate; a sixth potential state corresponds to resume/accelerate; a seventh potential state corresponds to a dead-band between resume/accelerate and cruise cancel; an eight potential state corresponds to cruise cancel; and, a ninth potential state corresponds to a short to ground or open circuit.

Compliance with probability of occurrence metrics is generally required to meet safety and performance requirements of various motor vehicle components. One concern with vehicle control devices is in improving failure modes and a desire to diagnose circuit conditions of such devices. For example, the single input cruise enable and PTO enable switches, previously mentioned hereinabove, do not readily provide adequate diagnosing for either an open circuit condition, such as a short to ground, or a short to battery condition because such conditions represent the enabled states of the switches. Although potential states of the 5 Volt based analog cruise control switch, previously mentioned hereinabove, are designated to indicate circuit conditions, sophisticated algorithm for operation and stringent part tolerances (e.g., for resistors) are typically required to implement the various potential states.

Accordingly, it is desirable to provide an enable switch for motor vehicle powertrain applications that reduces the probability of failure occurrence. In addition, it is desirable to provide a PTO and cruise enable that is simple to implement and assists in servicing procedures of the motor vehicle. Furthermore, other desirable features and characteristics of the present invention will become apparent from the subsequent detailed description of the invention and the appended claims, taken in conjunction with the accompanying drawings and this background of the invention.

BRIEF SUMMARY

According to various exemplary embodiments, an apparatus is provided for PTO and cruise enable having improved probability of failure occurrence and providing failure diagnosis. In an exemplary embodiment, the apparatus is an electronic control switch for a vehicle powertrain application having a control module for enabling/disabling the vehicle powertrain application. The control module includes a first discrete input connected to one of two reference voltages, and a second discrete input connected to one of the two reference voltages. An inverse reference voltage operator is connected to both the first input and the second input and configured such that the second input is connected to the second reference voltage when the first input is connected to the first reference voltage and the second input is connected to the first reference voltage when the first input is connected to the second reference voltage.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the drawings.

According to various embodiments, a logic switch is provided for power take off (PTO) and/or cruise enable having improved function state reliability and diagnostic capability of failure modes. In addition to failure mode diagnostic capability, a delineation of failure states, a default state, and an enable state, described in greater detail herein below, provided by the switch are suited to applications requiring a degree of probability of occurrence metrics for safety requirements or other vehicle production requirements.

Figure 1:
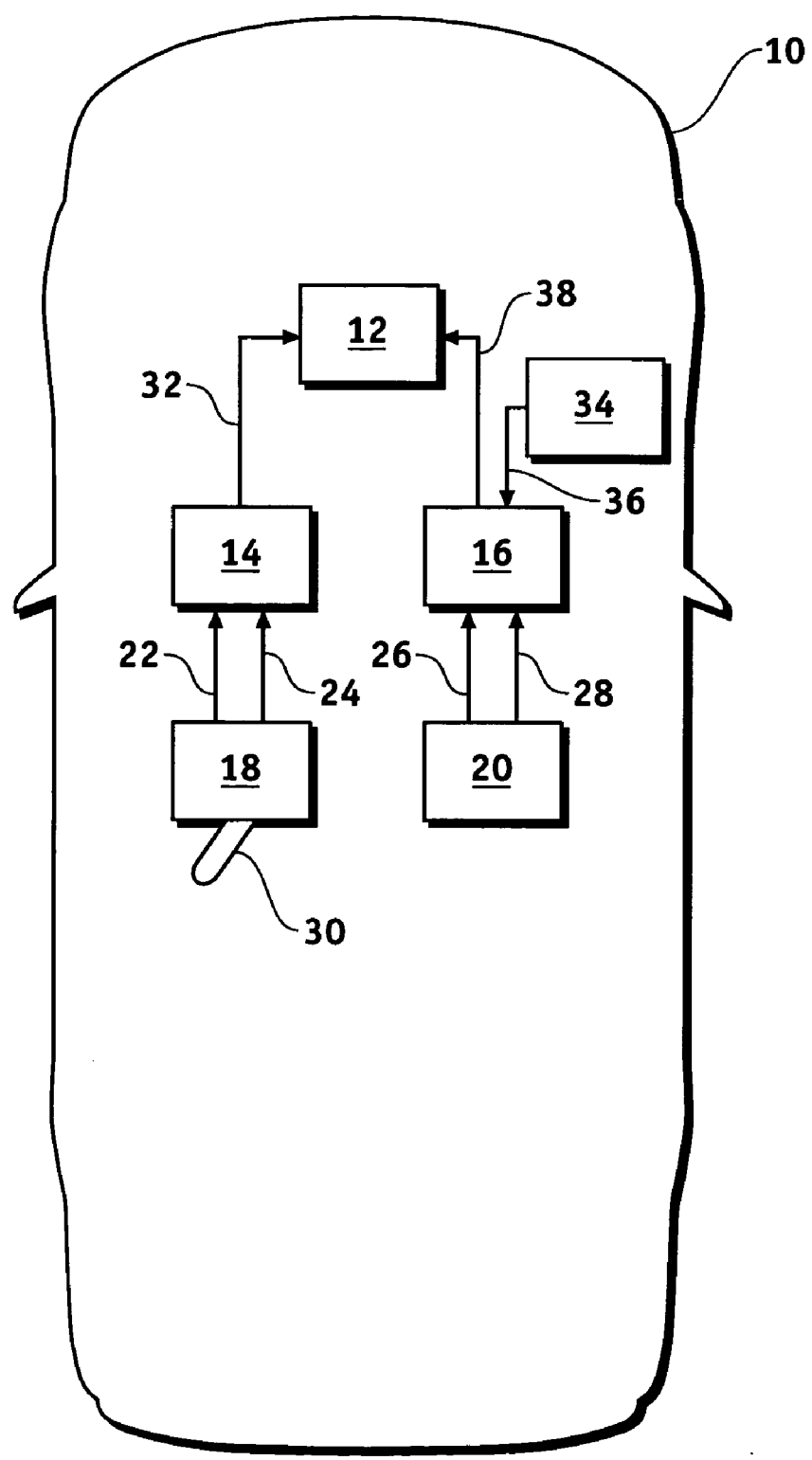
FIG. 1 is a block diagram of an exemplary vehicle.

Referring to the drawings, FIG. 1 is a block diagram of an exemplary vehicle, shown generally at 10, having a variety of components 14, 16 communicating with a variety of switches 18, 20 to receive control signals 22, 24, 26, 28. Additional downstream motor vehicle components 12 may be in communication with the components 14, 16. It should be appreciated that the blocks of FIG. 1 (as well as the blocks in the other block diagrams disclosed herein) can represent functional elements and discrete hardware elements. For example, in one embodiment of the invention, some of the functions or hardware elements illustrated in FIG. 1 may be implemented in a single processor unit. Alternatively, a portion of the functions may be implemented in a single processor unit in combination with hardware elements. The functions can be implemented in hardware, all in software, or a combination of hardware and software can be used The components 14, 16 represent powertrain related applications or functions such as PTO enable and cruise enable functions and sub-functions thereof, such as PTO torque limiting. In an exemplary embodiment, an electronic control switch 18 for a vehicle powertrain function, such as PTO enable and cruise enable, is provided having a control module 14 for enabling/disabling, or turning on/off, the vehicle powertrain function. For example, a PTO module 14 receives logic signals 22, 24 from the PTO enable switch 18 and transmits a control signal 32 to a powertrain control module (PCM) 12 or engine control module (ECM) based on the logic signals 22, 24. In this example, PTO function is enabled or disabled depending on the received logic signals 22, 24. In another example, a cruise control module 16 receives logic signals 26, 28 from the cruise enable switch 20 and an input signal 36 from a cruise function switch 34 and transmits a control signal 38 to the PCM 12 based on the received signals 26, 28, 36. In this example, cruise function is enabled or disabled depending on the received logic signals 26, 28, and a variety of cruise functions, such as set/coast and resume/accelerate, is enabled or disabled depending on the received input signal 36 in combination with the received logic signals 26, 28. Although powertrain functions are described herein, reference to powertrain functions is for convenience of illustrating exemplary applications. A variety of other motor vehicle components may receive control signals from control modules to implement a variety of vehicle functions.

Figure 2:
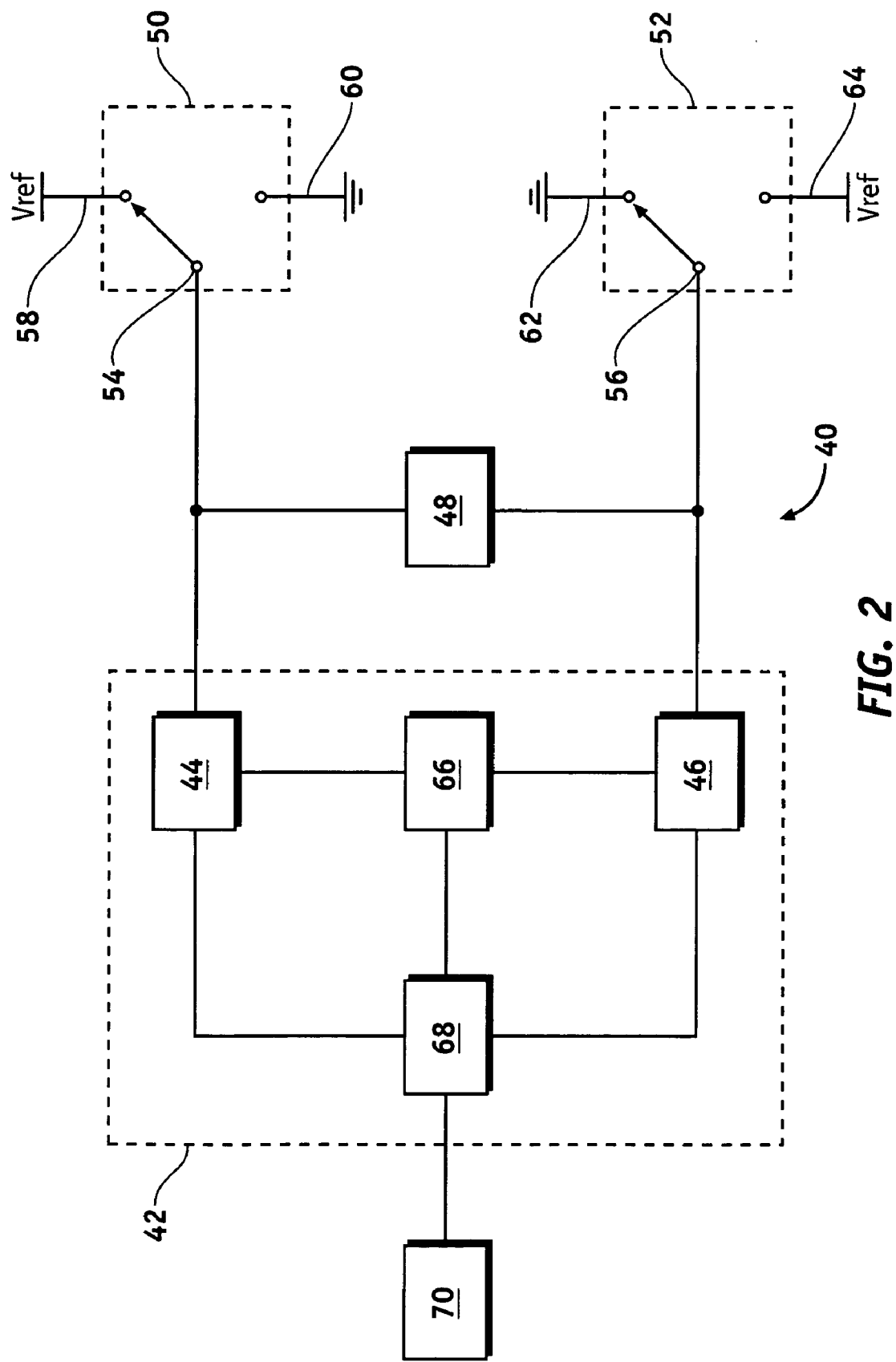
FIG. 2 is a block diagram of a one exemplary embodiment of a switching circuit and a control module.

FIG. 2 is a block diagram of a one exemplary embodiment of a switching circuit, shown generally at 40, and a control module 42, such as a PTO enable or a cruise enable as previously mentioned hereinabove. The control module 42 includes a first input 44 connected to one of a first reference voltage and a second reference voltage and a second input 46 connected to one of the first reference voltage and the second reference voltage. One of the reference voltages is preferably a high reference voltage, such as a battery voltage (e.g., $B^+$ or $V_{ref}$), and the other reference voltage is preferably a low reference voltage, such as ground or 0 Volts. $V_{ref}$ may also be the same reference voltage provided to digital circuitry in the vehicle 10 (FIG. 1) or any other voltage typically used in vehicle components. For low current applications, a resistor (not shown) may be added to the switching circuit 40. Those skilled in the art will appreciate that voltage divider circuits and analog-to-digital converters (not shown) may optionally be included in the switching circuit 40 depending on input requirements of the control module 42 and values of the reference voltages.

In one embodiment, the switching circuit 40 includes two double throw switches 50, 52. The switches 50, 52 are typically configured to select an output from the two reference voltages (e.g., a high reference voltage (e.g., $V_{ref}$) and a low reference voltage (e.g., ground)). The switches 18 (FIG. 1), 20 (FIG. 1), 50, 52 are any devices capable of providing various output signals 22, 24, 26, 28 (FIG. 1), such as logic high and logic low signals, to the components 14 (FIG. 1), 16 (FIG. 1), 42 in response to user commands, sensor readings or other input stimuli. In an exemplary embodiment, the switch 18 (FIG. 1) responds to user selections made by displacing or activating a lever 30 (FIG. 1) or other actuator on the switch 18 as appropriate. In another embodiment, the switch 20 responds to non-actuated input, such as a sensor reading. Various switches may be formulated with electrical, electronic, and/or mechanical actuators to produce appropriate output signals onto a wire or other electrical conductor joining the switches 18 (FIG. 1), 20 (FIG. 1), 50, 52 and the components 14 (FIG. 1), 16 (FIG. 1), 42. These logic signals may be processed by the components 14 (FIG. 1), 16 (FIG. 1), 42 to place the components into desired states as appropriate.

As best shown in FIG. 2, the switches 50, 52 are single pole double throw (SPDT) switches. Each of the SPDT switches 50, 52 has a pole 54, 56 connected to a respective input 44, 46 of the control module 42 and a pair of terminals 58, 60, 62, 64 connected to a respective reference voltage. For example, as best shown in FIG. 2, a first SPDT switch 50 has a pole 54 connected to the first input 44, a high reference terminal 58 connected to $V_{ref}$, and a low reference terminal 60 connected to ground. A second SPDT switch 52 has a pole 56 connected to the second input 46, a low reference terminal 62 connected to ground, and a high reference terminal connected to $V_{ref}$.

An inverse reference voltage operator 48 is connected to both the first input 44 and the second input 46 such that first input 44 is connected to the high reference terminal 58, corresponding to the first reference voltage (e.g., $V_{ref}$), when the second input 46 is connected to the low reference terminal 62, corresponding to the second reference voltage (e.g., ground), and the first input 44 is connected to the low reference terminal 60, corresponding to the second reference voltage, when the second input 46 is connected to the first reference voltage. The inverse operator 48 may be implemented using a variety of mechanical biasing devices and logic circuitry. The particular implementation of the inverse operator 48 is not critical to the present invention so long as one of a low state and high state or high state and low state combination is received by the inputs 44, 46.

Figure 3:
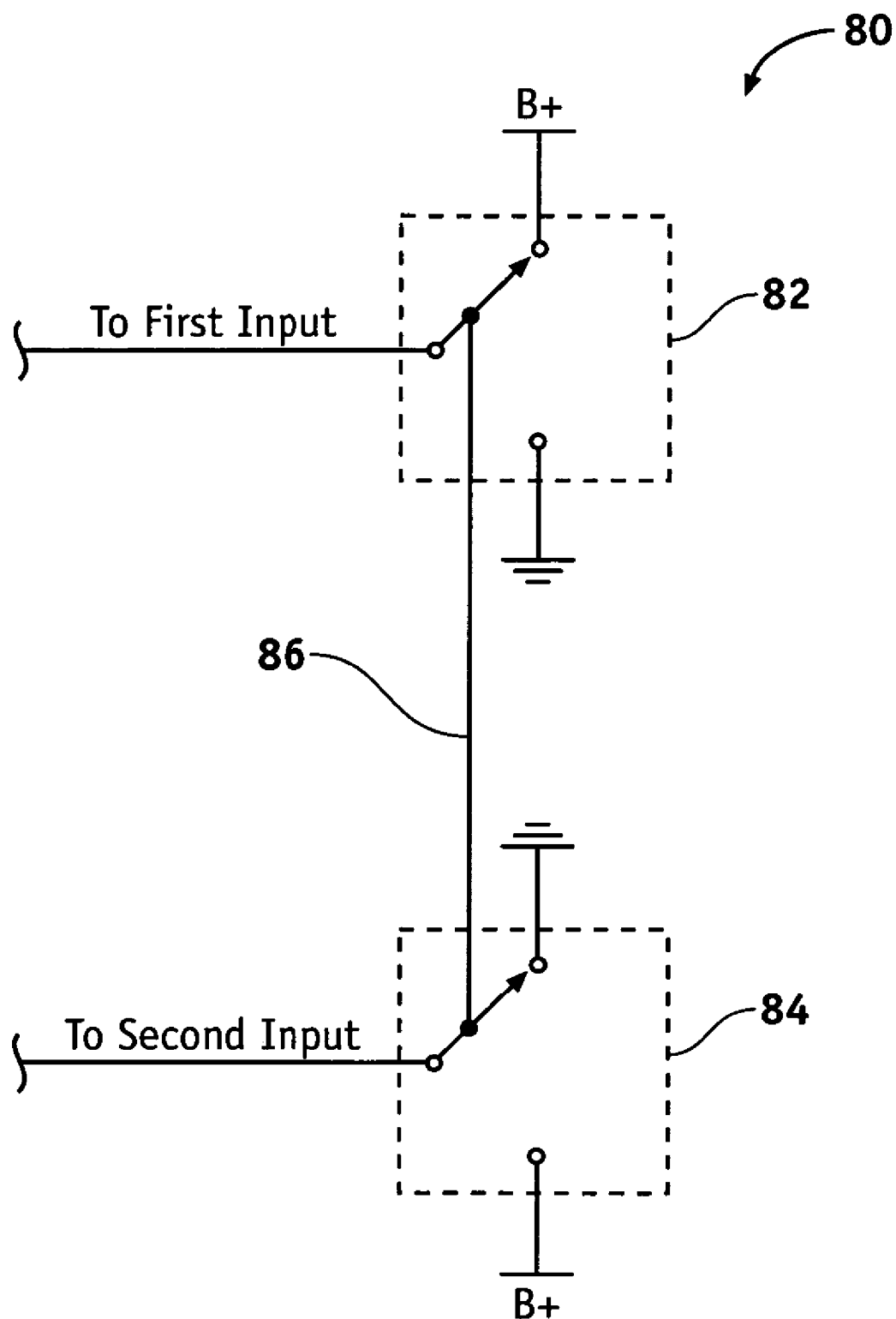
FIG. 3 is a block diagram of another exemplary embodiment of a switching circuit.

FIG. 3 is a block diagram of another exemplary embodiment of a switching circuit, shown generally at 80, having two SPDT switches 82, 84. In this embodiment, the inverse operator 86 is represented by a tie between the two SPDT switches 82, 84 that are both configured to displace in a same direction or opposite states, such as high and low or up and down. For example, the tie 86 biases a first SPDT switch 82 to a high state, corresponding to a received first reference voltage (e.g., $B^+$), when a second SPDT switch 84 is biased to a low state, corresponding to a received second reference voltage (e.g., ground) and biases the first SPDT switch 82 to the low state, corresponding to the received second reference voltage (e.g., ground), when the second SPDT switch 84 is biased to the high state, corresponding to the received first reference voltage (e.g., $B^+$). A double pole double throw (DPDT) switch may also be used to function in place of the two SPDT switches 82, 84 connected by the tie 86.

In one embodiment, the control module 42 may be a microprocessor-based controller having a timing unit 66 connected to the first input 44 and the second input 46 and a comparator 68 for generating a control signal based on the timing unit 66, the first input 44, and the second input 46. In this embodiment, the inputs 44, 46 are discrete inputs. Conventional PTO control modules may have system safety times of over 100 ms although higher periods are possible, such as 200 ms. Using the two inputs 44, 46, contact bounce times detected by the timing unit may be set from about 20-50 ms although lower periods are possible when using low current. The contact bounce separating the first input 44 and the second input 46 is well within the system safety time. When the contact bounce times of the inputs 44, 46 are within the safety times, the comparator 68 determines a function state from a pre-determined table of functions, described in greater detail hereinbelow and in Table 1, that is stored in the control module 42.

Based on a pre-determined forward position look-up table of function states corresponding to the first input 44 and second input 46, the control module 14 (FIG. 1), 16 (FIG. 1), 42 determines and transmits an appropriate control signal 32, 38 (FIG. 1).

TABLE 1

| Input 1 | Input 2 | Function State |
|---------|---------|----------------|
| low | low | Failure State |
| low | high | Default State (Cruise or PTO OFF State) |
| high | low | Enable State (Cruise or PTO On State) |
| high | high | Failure State |

Table 1 shows a variety of function states corresponding to various combinations of signals received by the first input 44 and the second input 46 in an exemplary embodiment. Depending on the function state as indicated by the inputs 44, 46, the control module outputs the control signal 32, 38 (FIG. 1) to an appropriate vehicle component, such as PCM or ECM.

Servicing procedures of vehicle components is improved using the electronic switch and control module configuration described herein. For example, a change in state from the enable state having first input high and second input low to a failure state having first input low and second input low, in the same enable state position, indicates a short to ground of the first input. In another example, a change in state from the enable state having first input high and second input low to a failure state having first input high and second input high, in the same enable state, indicates a short to battery of the second input. In another example, a change in state from the default state having first input low and second input high to a failure state having first input low and second input low, in the same default state, indicates a short to ground of the second input. In yet another example, a change in state from the default state having first input low and second input high to the failure state having first input high and second input high, in the same default state, indicates a short to battery of the first input.

The PTO enable or cruise enable function can be implemented as either a latched state or with a momentary/latched state. In the latched state embodiment, the control module 42 operates in the default state, or OFF state, until the enable state, or ON state, is detected. When the enable state is detected, the control module 42 transmits a control signal corresponding to the enable state until a default state or failure state is detected. In the momentary/latched state embodiment, the switching circuit 40 toggles between the default state and the enable state and the control module 42 changes state when the enable state or the failure state is detected. For example, the control module 42 initially operates in the default state. When the enable state is detected, the control module 42 changes to the enable state and remains in the same even when the switching circuit 40 may toggle back to the default state. When the enable state is subsequently detected again or a failure state is detected, the control module 42 changes to the default state. When the enable state is subsequently detected once more, the control module 42 changes to the enable state.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An electronic control switch for a vehicle powertrain application, said control switch comprising:
   a control module for enabling/disabling a vehicle driveline application, said control module comprising:
      a first input connected to one of a first reference voltage and a second reference voltage;
      a second input connected to one of the first reference voltage and the second reference voltage;
      a first failure state based on said first input and said second input both receiving the first reference voltage;
      a default off state based on said first input receiving the second reference voltage and said second input receiving the first reference voltage;
      an enable state based on said first input receiving the first reference voltage and said second input receiving the second reference voltage; and
      a second failure state based on said first input and said second input both receiving the second reference voltage; and
   an inverse reference voltage operator connected to both said first input and said second input, said inverse reference voltage operator connecting said second input to the second reference voltage when said first input is connected to the first reference voltage and connecting said second input to the first reference voltage when said first input is connected to the second reference voltage.

2. A control switch according to claim 1, wherein said default off state is selected from a cruise OFF state and a PTO OFF state; and wherein said enable state is selected from a cruise ON state and a PTO ON state.

3. A control switch according to claim 1, wherein said control module further comprises a comparator connected to said first input and said second input and configured to determine an input error when said default off state changes to one of said first failure state and said second failure state and when said enable state changes to one of said first failure state and said second failure state.

4. A control switch according to claim 3, wherein the first reference voltage is 0 volts and the second reference voltage is a battery voltage.

5. A control switch according to claim 4, wherein said comparator determines a first input error corresponding to a short to ground of said first input when said enable state changes to said first failure state; wherein said comparator determines a first input error corresponding to a short to battery of said first input when said default off state changes to said second failure state; wherein said comparator determines a second input error corresponding to a short to battery of said second input when said enable state changes to said second failure state; and wherein said comparator determines a second input error corresponding to a short to ground of said second input when said default off state changes to said first failure state.

6. A control switch according to claim 1, wherein said control module is a microprocessor-based controller; and wherein said first input and said second input are both discrete inputs.

7. A control switch according to claim 6, wherein said control module is configured to one of a latched state and a momentary/latched state.

8. A control switch according to claim 1, wherein said inverse reference voltage operator comprises:
   a first single pole double throw (SPDT) switch connecting said first input with one of the first reference voltage and the second reference voltage; and
   a second SPDT switch connecting said second input with one of the first reference voltage and the second reference voltage.

9. An electronic switching apparatus for powertrain application enable, said apparatus comprising:
   a first terminal connected to a first reference voltage;
   a second terminal connected to a second reference voltage;
   a third terminal connected to the second reference voltage;
   a fourth terminal connected to the first reference voltage; and
   a control module enabling/disabling powertrain applications, said control module comprising:
      a first input connected to one of said first terminal and said second terminal; and
      a second input connected to one of said third terminal and said fourth terminal; and
      a look-up function table based on said first input and said second input, said function table comprising:
         a first failure state based on said first input and said second input both receiving the first reference voltage;
         a default off state based on said first input receiving the second reference voltage and said second input receiving the first reference voltage;
         an enable state based on said first input receiving the first reference voltage and said second input receiving the second reference voltage; and
         a second failure state based on said first input and said second input both receiving the second reference voltage,
      wherein the powertrain application is enabled when said first input receives the second reference voltage and said second input receives the first reference voltage; and
      wherein the powertrain application is disabled when said first input receives the first reference voltage and said second input receives the second reference voltage.

10. An apparatus according to claim 9, wherein said first reference voltage corresponds to a battery voltage; and wherein said second reference voltage corresponds to a ground.

11. An apparatus according to claim 9, wherein said first reference voltage corresponds to a ground; and wherein said second reference voltage corresponds to a battery voltage.

12. An apparatus according to claim 9, wherein said control module is a microprocessor-based controller; and wherein said first input and said second input are both discrete inputs.

13. An apparatus according to claim 9 further comprising:
   a first SPDT switch connected to one of said first terminal and said second terminal and having a first pole connected to said first input; and
   a second SPDT switch connected to one of said third terminal and said fourth terminal and having a second pole connected to said second input;
   wherein said second SPDT switch is connected to said third terminal when said first SPDT switch is connected to said first terminal; and
   wherein said second SPDT switch is connected to said fourth terminal when said first SPDT switch is connected to said second terminal.

14. An apparatus according to claim 9 further comprising:
   a double pole double throw (DPDT) switch connected to one of a pair of said first terminal and said third terminal and a pair of said second terminal and said fourth terminal, said DPDT switch having a first pole connected to said first input and a second pole connected to said second input;
   wherein said first pole is connected to said first terminal when said second pole is connected to said third terminal; and
   wherein said first pole is connected to said second terminal when said second pole is connected to said fourth terminal.

15. An apparatus according to claim 9, wherein the powertrain applications are selected from PTO enable, PTO torque limiting enable, and cruise enable.

16. An electronic control system comprising:
   a first switch comprising:
      a first terminal connected to a first reference voltage;
      a second terminal connected to a second reference voltage; and
      a pole selectively connected to one of said first terminal and said second terminal;
   a second switch comprising:
      a first terminal connected to the second reference voltage;
      a second terminal connected to the first reference voltage; and
      a pole selectively connected to one of said first terminal and said second terminal;
   a switch connector interconnecting said first switch and said second switch, said switch connector connecting said pole of said first switch to said first terminal of said first switch when said pole of said second switch connects to said second terminal of said second switch, said switch connector connecting said pole of said first switch to said second terminal of said first switch when said pole of said second switch connects to said first terminal of said second switch; and
   a control module enabling/disabling powertrain functions, said control module comprising:
   a first input connected to said pole of said first switch;
   a second input connected to said pole of said second switch; and
   a function table comprising:

a first failure state based on said first input and said second input both receiving the first reference voltage;

a default off state based on said first input receiving the second reference voltage and said second input receiving the first reference voltage;

an enable state based on said first input receiving the first reference voltage and said second input receiving the second reference voltage; and a second failure state based on said first input and said second input both receiving the second reference voltage, wherein said control module determines a function state from said function table and outputs a control signal based on the function state.

17. An electronic control system according to claim 16, wherein said control module is a microprocessor-based controller; and wherein said first input and said second input are both discrete inputs.

18. An electronic control system according to claim 16, wherein said control module is configured to one of a latched state and a momentary/latched state.

19. An electronic control system according to claim 16 further comprising a powertrain control module connected to said control module.

20. An electronic control system according to claim 16, wherein said control module is configured to determine a first input error corresponding to a short to ground of said first input when said enable state changes to said first failure state; wherein said control module is configured to determine a first input error corresponding to a short to battery of said first input when said default off state changes to said second failure state; wherein said control module comprises a comparator that is configured to determine a second input error corresponding to a short to battery of said second input when said enable state changes to said second failure state; and wherein said comparator is configured to determine a second input error corresponding to a short to ground of said second input when said default off state changes to said first failure state.

* * * * *